(12) United States Patent
Kassayan

(10) Patent No.: US 8,773,085 B2
(45) Date of Patent: Jul. 8, 2014

(54) APPARATUS AND METHOD FOR EFFICIENT DC-TO-DC CONVERSION THROUGH WIDE VOLTAGE SWINGS

(75) Inventor: Reza Kassayan, Atherton, CA (US)

(73) Assignee: LEDillion Technologies Inc., Atherton, CA (US)

( * ) Notice: Subject to any disclaimer, the term of this patent is extended or adjusted under 35 U.S.C. 154(b) by 437 days.

(21) Appl. No.: 13/069,251

(22) Filed: Mar. 22, 2011

(65) Prior Publication Data

US 2012/0243267 A1 Sep. 27, 2012

(51) Int. Cl.
G05F 1/253 (2006.01)

(52) U.S. Cl.
USPC .......................................................... 323/262

(58) Field of Classification Search
USPC ............. 363/16; 323/222–224, 259, 282, 262
See application file for complete search history.

(56) References Cited

U.S. PATENT DOCUMENTS

| | | | |
|---|---|---|---|
| 5,132,888 A | 7/1992 | Lo et al. | |
| 5,287,261 A * | 2/1994 | Ehsani | 323/225 |
| 5,570,276 A * | 10/1996 | Cuk et al. | 363/16 |
| 5,668,466 A | 9/1997 | Vinciarelli et al. | |
| 5,936,857 A | 8/1999 | Jacobs et al. | |
| 6,051,961 A | 4/2000 | Jang et al. | |
| 6,388,896 B1 | 5/2002 | Cuk | |
| 6,788,033 B2 | 9/2004 | Vinciarelli | |
| 6,909,622 B2 | 6/2005 | Weng | |
| 6,940,189 B2 * | 9/2005 | Gizara | 323/283 |
| 7,795,761 B2 | 9/2010 | Huynh et al. | |
| 2005/0040800 A1 * | 2/2005 | Sutardja | 323/283 |
| 2007/0085489 A1 | 4/2007 | Robinson et al. | |
| 2008/0007236 A1 | 1/2008 | Elbanhawy | |
| 2009/0185398 A1 | 7/2009 | Cuk | |
| 2009/0290384 A1 | 11/2009 | Jungreis | |
| 2010/0118573 A1 | 5/2010 | Saint-Pierre | |
| 2011/0037446 A1 | 2/2011 | Engelhardt et al. | |

OTHER PUBLICATIONS

International Search Report and Written Opinion issued to International Patent Application No. PCT?US2012/029996, Jul. 11, 2012, 9 pgs.

* cited by examiner

*Primary Examiner* — Jue Zhang
(74) *Attorney, Agent, or Firm* — Cooley LLP

(57) ABSTRACT

A DC-to-DC converter includes two or more inductors coupled to a common core and two or more active switches, where at least one active switch is in an input current path. A controller operates the two or more active switches such that a DC input is driven through one or more of the two or more inductors to implement a power conversion operation.

20 Claims, 12 Drawing Sheets

APPARATUS AND METHOD FOR EFFICIENT DC-TO-DC CONVERSION THROUGH WIDE VOLTAGE SWINGS

FIELD OF THE INVENTION

This invention relates generally to power conversion. More particularly, this invention relates to an efficient DC-to-DC converter operable through wide voltage swings.

BACKGROUND OF THE INVENTION

There is a growing demand for DC-to-DC converters with improved conversion efficiency and reduced size. Design techniques vary, with some techniques reducing the voltage or current, others increasing the voltage or current, and still others alternately increasing or decreasing voltage or current. In a typical DC-to-DC converter, one or more switches connect to input power, a capacitor or inductor stores excess energy in one phase, and in another phase the stored energy is released to output nodes.

Each technique has its own advantages and disadvantages. There are multiple tradeoffs between component sizes, overall efficiency and optimal zones of input to output voltage ratios. For example, increasing switching frequency usually results in a reduction of component size, but concomitantly increase switching losses due to parasitic capacitances and switch transition losses. As a result overall efficiency is reduced.

A common method of AC-to-DC conversion is to use a Bridge Rectifier to convert AC input to DC, and then use a DC-to-DC switching converter to generate the proper DC output. Past attempts to simultaneously meet the objectives of improving conversion efficiency and reducing the converter size have been dominated by overall efficiency concerns. Efficiency is particularly important over a wider input to output voltage ratio, as experienced in AC-to-DC conversions. An AC source usually goes through a wide range of momentary voltages in each cycle, hindering any attempt to optimize a DC-to-DC converter for a specific input to output voltage ratio.

One approach to overcome the adverse effect of big variations in input voltage is to store charge in a storage capacitor, and to use the stored charge at the times the AC input voltage is below a certain level, referred to as a "transition period". There are two disadvantages associated with this method. First, a relatively large capacitor is required to store enough energy through a transition period. Second, during transition periods small or no current is drained from the input, which results in electrical current drain from the input AC line to transpire over a narrower time frame, mostly around peak input voltages. This eventually results in inefficient power transfer and a lower Power Factor.

Switching converters can be classified into three major converter classes based upon the number of active power switches employed. The two-switch converter class includes buck, boost and flyback converters. The three-switch converter class includes forward converters. The four-switch converter class includes half-bridge and push-pull switching DC-to-DC converters. The switches may be active or passive. An active switch is controlled by modulating a gate. A passive switch, such as a diode, does not require a separate control.

In view of the foregoing, it would be desirable to provide improved techniques for power conversion. In particular, it would be desirable to provide reduced switching losses and reduced component sizes in a converter utilized in connection with wide voltage swings.

SUMMARY OF THE INVENTION

An embodiment of the invention includes a DC-to-DC converter with two or more inductors coupled to a common core and two or more active switches, where at least one active switch is in an input current path. A controller operates the two or more active switches such that a DC input is driven through one or more of the two or more inductors to implement a power conversion operation.

Another embodiment of the invention includes a DC-to-DC converter with two or more inductors coupled to a common core and two to four active switches, where at least one active switch is in an input current path. A controller operates the two to four active switches such that a DC input is driven through one or more of the two or more inductors to alternately implement buck, boost and flyback power conversion operations.

An embodiment of the invention includes a method of converting DC power. A DC input is received. Control signals are applied to active switches, where the control signals have alternating duty cycles between 25% and 100%. The DC input is driven, in response to the control signals, through at least one of two or more inductors on a common core to alternately implement buck, boost and flyback power conversion operations.

The disclosed DC-to-DC converter has ultra high efficiency from reduced switching losses that enables very high switching frequency and reduced component sizes and weights. In addition, the converter has small magnetic components. Further, the converter provides high output DC load current capability.

The disclosed techniques reduce switching duty cycle variation to yield improved efficiency. Duty cycle variations are used to implement a range of voltage or current ratios. As duty cycles change to accommodate different transfer ratios, switch loss can increase due to the effect of parasitic capacitances and/or switch transition loss. The invention utilizes one or more switches as a switching mode changer. This reduces the need for dramatic changes in switching duty cycles, while still achieving a large voltage or current transfer ratio.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

FIGS. 1a-1j illustrate various embodiments of a three-switch implementation of the invention. Observe that switch A is always in the input pathway and switch C is always in the output pathway. Depending upon the status of switch B and/or switch C, inductor energy storage can be through L1 only, or L1 and L2 in series.

Figure 1A:
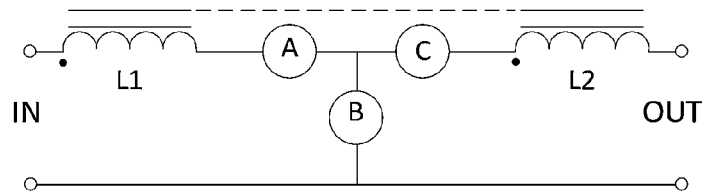
FIGS. 1a-1j illustrate various embodiments of a three-switch implementation of the invention.

In FIG. 1a, switch A can be a master toggling switch to achieve a step down (buck) conversion. The state of switch B is the inverse of the state of switch A. Switch C is always on. For example, when switch A is closed switch B is open so whenever input voltage is higher than output voltage a positive current passes through L1, switch A, Switch C and L2 to the output. Opening switch A and closing switch B disconnects the input. Consequently, stored energy in inductor L2 releases to output through switch C and switch B.

This configuration is in contrast to a buck converter where inductor energy storage and release pathways use both L1 and L2. In FIG. 1a in a typical case where L1=L2=Lx, the effective inductance of a buck converter is around 4*Lx during energy storage inside the inductor core. In FIG. 1a, only L2 is in the energy release pathway so the effective inductance equals Lx.

In another operational embodiment of FIG. 1a, switch B is turned on and switch C is configured as the inverse state of switch A. Thus, when switch A is on energy is stored in inductor L1, regardless of output voltage. When switch A turns off, L2 inductor energy releases through switch C and switch B. This configuration behaves as a flyback converter where input and output share a line. For example, when L1=L2=Lx, the energy storage and release pathways see Lx, representing a 1-to-1 ratio flyback conversion. Selecting different values for L1 and L2 and altering duty cycles can generate different effective current or voltage transfer ratios in this mode.

In a third configuration, the circuit of FIG. 1a emulates a boost (step up) mode of operation. Here, switch A is always on, and switch C is configured as the inverse state of switch B. Turning switch B on stores energy in inductor L1. Turning switch B off releases inductor energy through L1, L2, switch A and switch C. Where L1=L2=Lx, the inductor energy release pathway equals 4*Lx.

Switch A, B or C can operate in phase, out of phase, with overlapping duty cycles, or without overlapping duty cycles, or even randomly. Preselected L1 and L2 values can generate very wide effective current or voltage transfer ratios. This is achieved with only one physical inductor (L1 and L2 are on the same core), and at least three switches. Capacitors can be optionally added to different nodes in the system to reduce input and output ripple currents and/or voltages.

Switching losses are maintained at a minimum by minimizing duty cycle changes across a very wide input voltage range. For example, when the input voltage is significantly lower than the output voltage, boost mode can be selected. When the input to output ratio is closer to the ratio of L1 to L2, a flyback equivalent behavior is selected. When the input goes over a certain threshold higher than the output voltage a buck mode is selected.

Consider again the example where L1=L2=Lx. Also assume that an ideal output voltage (Vo) is ⅓ of the peak input voltage (Vi), Vo=Vi peak/3. When configured for buck mode operation, during peak input voltage switch A sees a 4*Lx inductance. As both windings are on the same core, inductance saturation current (Isat) is half of when only one winding receives current. The inductance effective voltage is Vi−Vo=3*Vo−Vo=2*Vo. The time required to saturate the inductor core is proportional to inductance and inductor saturation current, and is inversely proportional to the voltage: (4*Lx*Isat/2)/(2*Vo)=Lx*Isat/Vo.

Now assume that the input voltage is closer to Vo (⅓ of Vi peak in this example), and the flyback mode is selected. In this mode input inductance is Lx and voltage across L1 is Vi=Vo. The time required to saturate the inductor core is proportional to: Lx*Isat/Vo. So even though the input voltage is ⅓ of the peak voltage, the time required to saturate the inductor core is the same.

For the boost mode, switch A is always ON, input current drain occurs both when switch B is on and off. This can increase input current drain. So at half the input voltage, compared to the flyback mode, the same power is drained from the input. This further expands the input voltage range that can drain input power, while maintaining a narrower switching frequency and with less variation of duty cycles compared to conventional methods.

To see the effect of this method on switching loss, assume that all coils and all switches have no parasitic resistance and that there is no other source of loss except the switches parasitic capacitances and transition losses. In the above mentioned example where L1=L2=Lx, at peak input voltage where a buck mode is used, only a 50% duty cycle on switch A is enough to reach a Vo equivalent to ⅓ of peak input voltage. A typical MOSFET capable of switching at a few hundred volts and current capability of a few amperes usually has switch transition times of around ten nanoseconds, and parasitic capacitances of around hundreds of picofarads. A quick calculation of switch switching loss would be: Psw=(V*I*(tRISE+tFALL))/(2*T) where Psw is switch power loss, V is the voltage across the switch while the switch is off, I is the switch current, tRISE and tFALL are the switch rise and fall times, and T is the switching period. If tRISE and tFALL are 10 nS, one may want to limit switching frequency to around 1 MHz to keep switch transition loss to less than 2% on each active switch (switch A and B). Let's assume the input voltage is 300V and the input current is 1 A. With a 50% duty cycle, input power is 300*1*50%=150 W. With 4% total loss (roughly 2% on switch A and 2% on switch B), efficiency would be 96% and 144 W is transferred to output. For an output ideal voltage of ⅓ of 300V (300/3=100V), this generates an output of 1.44 A. In this scenario, 6 W is lost in switches A and B combined. Now assume an input voltage that is ⅑ of the input peak voltage (300/9=33.33 volts) and boost mode is selected. A 50% duty cycle switching on switch B and C generates 100V at the output. The inductor discharge pathway is L1 and L2 so the total power drained from the input is (33.33*2*50%+33.33*1*50%)=50 W. This can be achieved at 333.33 KHz, so the total switching loss is insignificant at around 1.33%. In this case, 49.33 W is transferred to the output and 0.67 W is lost in switches B and C.

In the above example of the invention, the minimum efficiency was 96% at peak input voltage using a coil with saturation current of 1 A on both windings L1 and L2 in series. This stands in contrast to a prior art flyback converter. To achieve the same level of low voltage performance from a prior art flyback converter, a 1 to 3 ratio transformer is required. With this ratio, a 33.33V input voltage and 50% duty cycle on input and output switches generates a 100V at the output and comparable efficiency. Now if the input voltage increases to 300V, the duty cycle needs to be reduced to 10% to generate 100V at the output with the same 1 to 3 transformer (300*3/1*(10%/90%)=100V). This means that relative switching loss increases by a factor of 5 (50% in this invention versus 10% using a flyback converter) and input power drain is divided by 5 (300V*1 A*10%=30 W).

In summary, this means that in a prior art flyback converter at 300V input voltage, compared to this invention, the total input power drain and subsequently output power delivery is reduced by a factor of five (30 W instead of 150 W). To compensate for this loss in a prior art flyback convertor, the only option is to increase inductor saturation current and inductor storage capacity 5 fold, increasing ON state input current to 5 A, and reducing switching frequency by a ratio of 5 to compensate for increase in Psw. Inductance increase and saturation current increase by 5 times roughly means more than a 5 times increase in coil size. As input current has increased and frequency of operation has reduced, to maintain the same input ripple voltage, input capacitors need to be 5*5=25 times larger. An increase in inductance is accompanied by an increase in inductor parasitic resistance.

Thus, in the prior art, component size needs to be increased to compensate for lost duty cycle. The invention does not have this problem because there are only small variations in duty cycles. In practice the invention's space saving can amount to more than one order of magnitude when compared to the prior art. Most state of the art high voltage switching regulators are limited by around one hundred kilohertz switching operations due to switching loss concerns. The invention is able to operate in excess of 500 KHz switching frequency in the case of 150 W from 300V input to 100V output, and in excess of 95% efficiency. At the same time, total component volume is reduced 10 to 30 times. A significantly smaller input capacitor (25 times smaller in the above example) enables a designer to use high reliability capacitors, such as ceramic capacitors instead of ordinary electrolytic capacitors. This is very important in designing high reliability power supplies. An electrolytic capacitor's life is usually around a couple of thousand hours at 105° C. or so, while ceramic capacitors can last several decades in similar conditions.

Observe that in each configuration switch A is in the input pathway and can be used to monitor input load properties. Switch C is always in output pathway and can be used to monitor output load properties. This is especially beneficial when a designer intends to monitor the Power Factor of the system and adjust switching frequency or switch duty cycle to maintain certain input or output load properties. For example, input current can be adjusted to mimic a near resistive behavior based on input voltage to achieve a Power Factor very close to 1. Alternately, input current or total input power can be adjusted for a fairly constant value. An increase in input current at lower input voltages compared to effective equivalent input resistance generates a "dynamic negative resistance", which means input equivalent impedance is reduced at lower input voltages. In a home or industrial environment this can be used to compensate for non-linear current drain of other major devices loaded on AC line and increase grid power line efficiency in some cases.

Figure 1B:
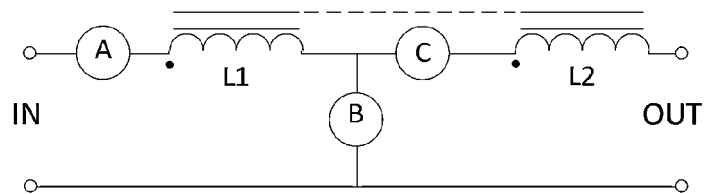
Figure 1C:
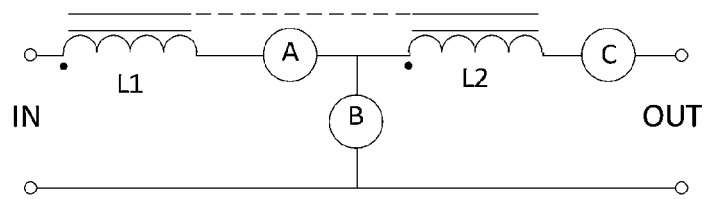
Figure 1D:
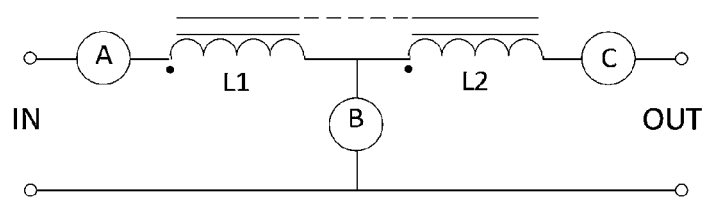

FIG. 1b is similar to FIG. 1a, but switch A and inductor L1 have changed positions, with switch A connected directly to the input followed by inductor L1. FIG. 1c is similar to FIG. 1a, but switch C and inductor L2 have changed positions, with switch C connected directly to the output following inductor L2. FIG. 1d is similar to FIG. 1a, but switch A is at the input and switch C is at the output, with inductors L1 and L2 sharing a common wire.

Figure 1E:
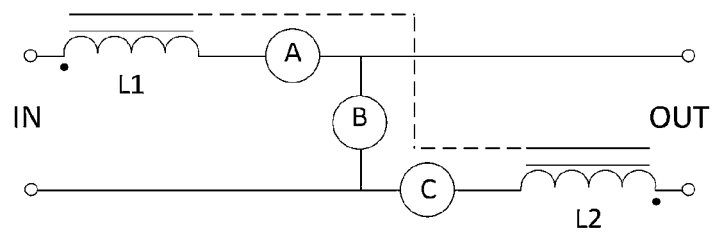
Figure 1F:
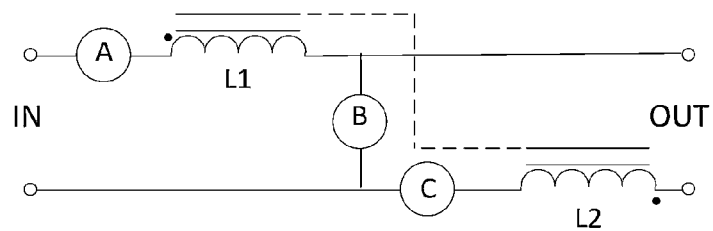
Figure 1G:
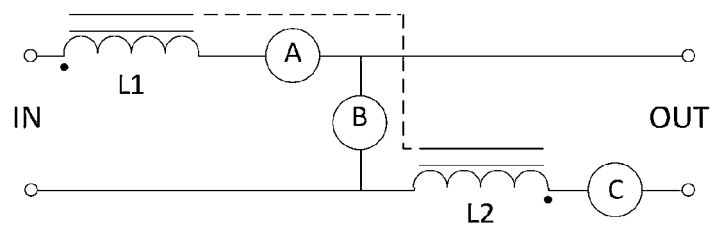
Figure 1H:
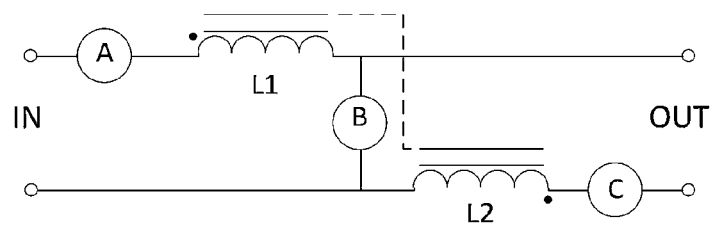

FIG. 1e illustrates a configuration where switch C and L2 are in a return pathway of the output. FIG. 1f is similar to FIG. 1e, but switch A and inductor L1 have changed positions, with switch A being directly connected to the input, followed by inductor L1. FIG. 1g is similar to FIG. 1e, but switch C and inductor L2 have changed positions, with switch C directly connected to the output. FIG. 1h is similar to FIG. 1g, but switch A is directly connected to the input.

Figure 1I:
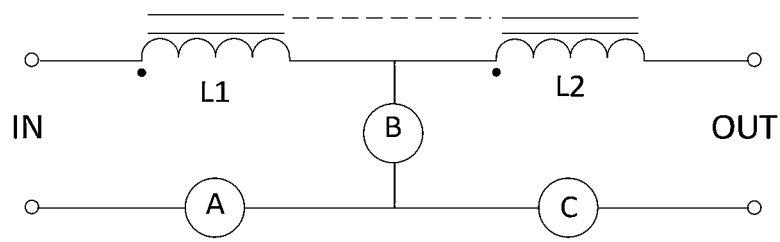
Figure 1J:
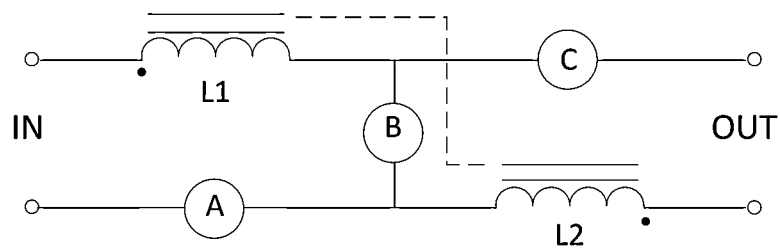

FIG. 1i is similar to FIG. 1e, but switches A and C are in the return pathway and inductors L1 and L2 share a common wire. FIG. 1j is similar to FIG. 1e, but switch A is in the input return pathway and inductor L2 is in the output return pathway.

Figure 2A:
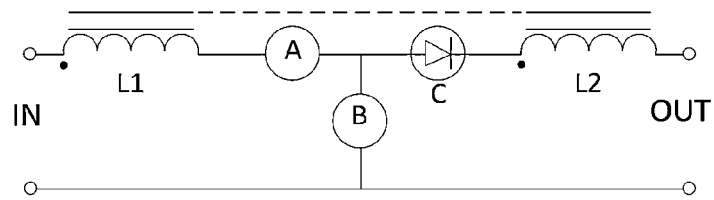
FIGS. 2a-2d illustrate various embodiments of the three-switch implementation employing passive switches.
Figure 2B:
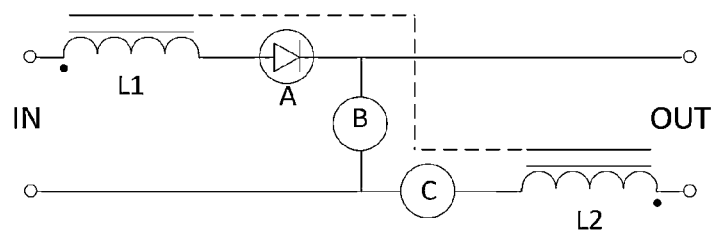
Figure 2C:
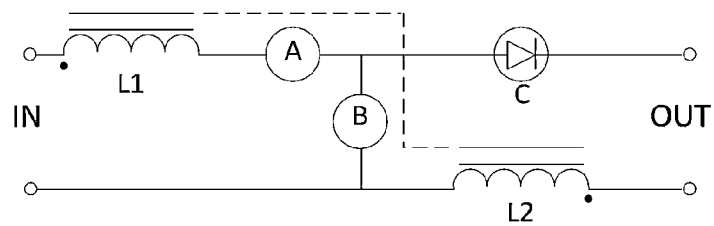
Figure 2D:
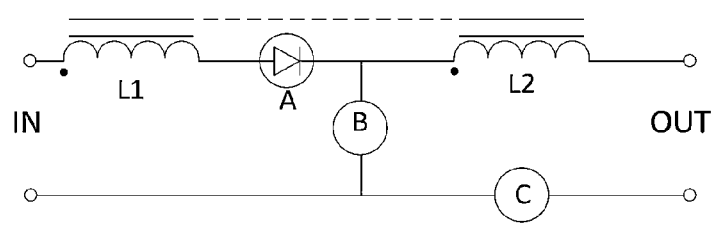

FIGS. 2a-2d illustrate a three switch implementation with at least one passive switch (i.e., a switch that is not actively controlled; a diode is a passive switch). FIG. 2a is the same as FIG. 1a, but switch C is a diode. FIG. 2b is the same as FIG. 1e, but switch A is a diode. In FIG. 2c, switch C is a diode and inductor L2 is in the output return pathway. In FIG. 2d, switch A is a diode and switch C is in the output return pathway.

Figure 3A:
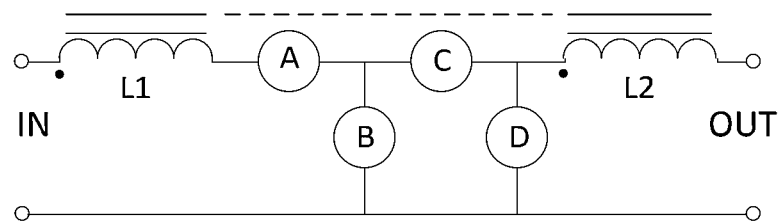
FIGS. 3a-3d illustrate various embodiments of a four-switch implementation of the invention.
Figure 3B:
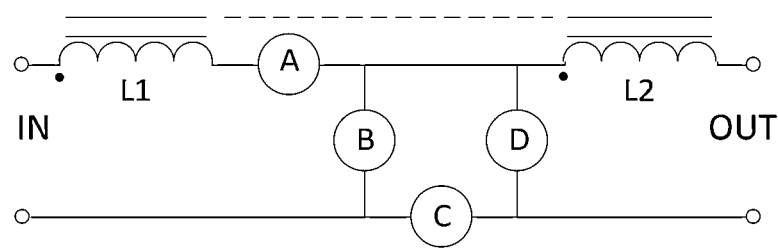
Figure 3C:
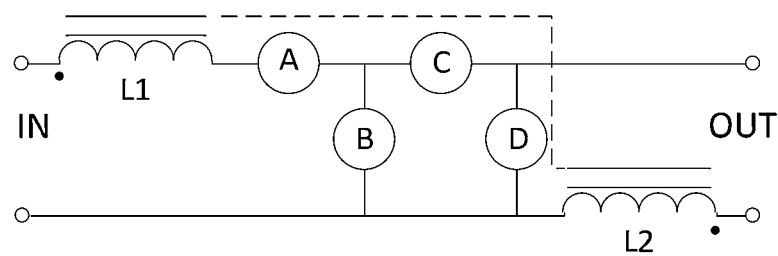
Figure 3D:
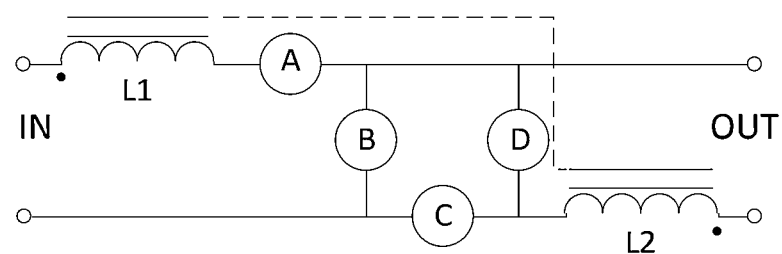

Another embodiment of the invention utilizes four switches. One benefit of this configuration is simpler switch control. FIGS. 3a-3d illustrate various four switch embodiments of the invention. FIG. 3a is an expanded version of the three-switch configuration in FIG. 1a, where a switch D is added. FIG. 3b is similar to FIG. 3a, but switch C is in the junction between input and output return pathways. FIG. 3c is similar to FIG. 3a, but inductor L2 is in the output return pathway. FIG. 3d is similar to FIG. 3b, but inductor L2 is in the output return pathway.

Figure 4A:
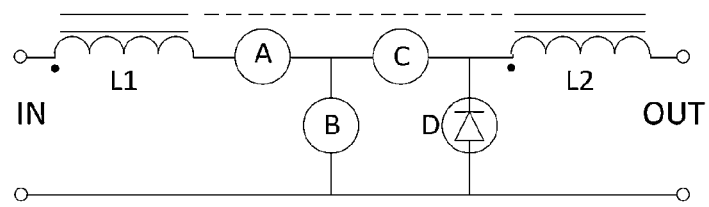
FIGS. 4a-4e illustrates various embodiments of a four-switch implementation employing passive switches.
Figure 4B:
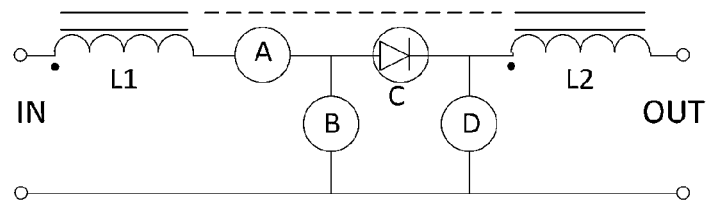
Figure 4C:
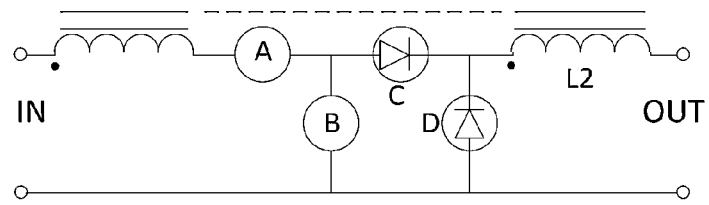
Figure 4D:
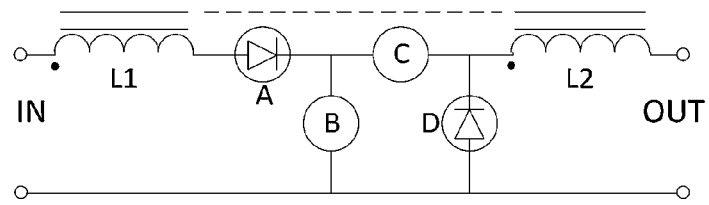
Figure 4E:
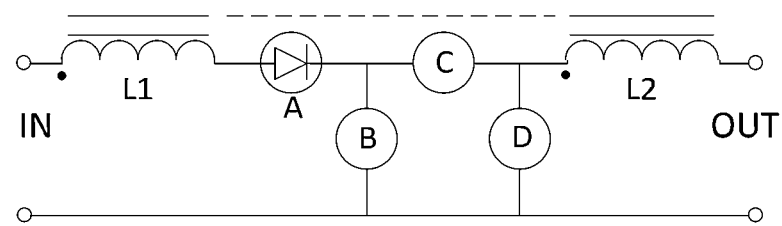

FIGS. 4a-4e show versions where one or two of the actively controlled switches are replaced with diodes. FIG. 4a is the same as FIG. 3a, but switch D is a diode. FIG. 4b is the same as FIG. 3a, but switch C is a diode. FIG. 4c is the same as FIG. 3a, but both switches C and D are diodes. FIG. 4d is the same as FIG. 3a, but both switches A and D are diodes. FIG. 4e is the same as FIG. 3a, but switch A is a diode.

FIG. 4c is a simplified version of FIG. 4a where two of the actively controlled switches have been replaced with diodes. In FIG. 4c, when switch B is closed, switch A can toggle to effectively act as a flyback converter with a shared line. L1 acts as a primary and L2 acts as a secondary of a transformer.

For the circuits of FIGS. 4a-4e, when switch B is open, toggling switch A results in a buck converter. In this condition, the output voltage is always lower than the input voltage. When switches A and C are closed and Vi is higher than Vo, positive current passes through L1, switch A, C and L2. As a result, energy is stored in L1 and L2. When switch A opens, L2 and switch D act as conduction path and energy is transferred to the output.

In a different configuration, switch B is closed and toggling switch A results in a flyback converter with a common line between input and output. In this condition, the output voltage can be lower or higher than the input voltage. When switch A is closed and switch C is open, regardless of output voltage, current passes through L1, switch A and switch B. As a result, energy is stored in L1. When switch A opens, L2 and switch D act as a conduction path and energy is transferred to the output.

In another configuration, switch A is on and switch B is used to toggle on and off. In this case, the converter acts as a modified boost converter. When switch B is on and switch C is off, regardless of output voltage, current flows through switch A, B and L1. Thus, L1 stores energy. When switch B turns off and switch C turns on, inductor energy from L1 and L2 is applied to the output.

Other combinations of toggling switch A and B with overlapping duty cycles can be used to achieve other voltage or current transfer ratios. This enables different current or voltage transfer ratios and other switching behaviors, including an equivalent Split-pi topology.

One advantage of the invention is the simplified control scheme to implement buck-boost functions. In all scenarios, switch A is always in the input current pathway toggling the input current. In one scenario switch B can act as transfer ratio "mode changer" to select between flyback and buck converter modes. These two switches can operate in conjunction, or independent from each other. Independent operation of these two switches can make the design of high voltage DC-to-DC and AC-to-DC converters much easier. For example, switch A can be activated depending on its current, and switch B can be activated based on momentary input voltage level. This lets switch A work at high frequency and very high voltages, without need for any communication to other switches. Designing a high speed communication pathway capable of working at high voltage differences is a challenge, and one major limiting factor for switched high voltage DC-to-DC converters. As switch A is always in the input current pathway, the same switch can be used to monitor input load properties and to make adjustments necessary for a desired Power Factor.

One advantage of the invention is wider arbitrary transfer ratios. Since both L1 and L2 are on the same core, when input power passes through both L1 and L2, inductance is significantly higher than L1, L2 or the sum of L1 and L2. For example, when L1=L2=Lx, the effective inductance is almost 4*Lx. This helps lower ripple current when the converter operates in a buck mode. In flyback or boost modes, only L1 is in the input conduction pathway so input switch A only sees L1, which is equal to Lx. This condition is beneficial, specifically to flyback mode, which enables a higher frequency operation. A lower inductance raises the current faster and the same level of stored energy inside the inductor core material is achieved sooner. Flyback or boost mode operation is usually needed when input voltage is lower than the output voltage or close to it. A higher frequency operation is better tolerated for the sake of parasitic capacitances operating at a lower voltage. Switch transition losses are low at lower input voltages. During buck mode the high inductance seen by the input pathway generated by L1 and L2 in series helps lower ripple current and reduces parasitic capacitance and switching losses. With the selection of different L1 and L2 values and proportions, very wide arbitrary voltage and current transfer ratios can be achieved with a small number of components, while switching loss can be kept at a minimum.

Figure 5A:
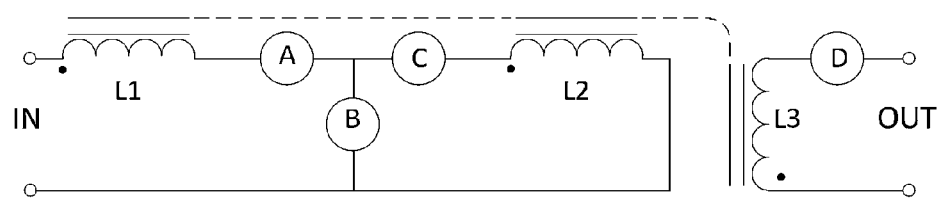
FIGS. 5a-5b illustrate embodiments of the invention with an isolated output.
Figure 5B:
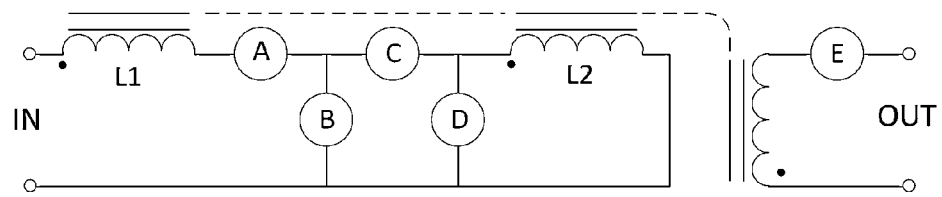

A third inductor, L3, on the same core can be added to generate an isolated output in either three or four switches configurations. A new actively controlled switch or diode is required to generate DC output in each case. FIGS. 5a and 5b show examples of an isolated inductor, L3. FIG. 5a shows the circuit of FIG. 1a with an additional inductor L3 and switch D to generate an isolated output. FIG. 5b shows an isolated output version of FIG. 3a with the addition of inductor L3 and switch E. This configuration has all of the benefits of a two coupled inductor version, along with having an isolated DC output.

Figure 6A:
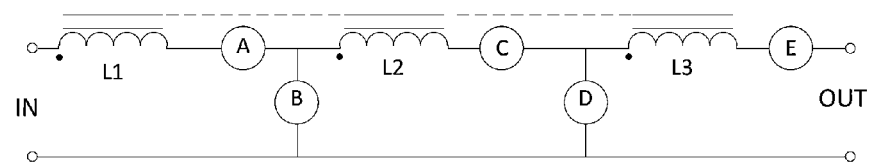
FIGS. 6a-6b illustrate the disclosed circuits of the invention in a daisy chain configuration.
Figure 6B:
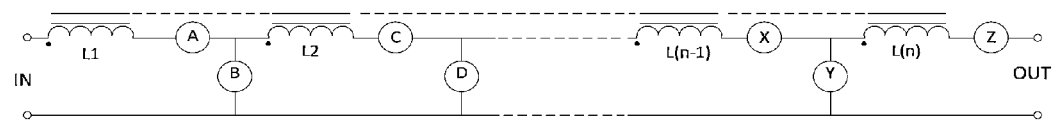

Multiple stages of this novel converter can be daisy chained to similar stages or other standard DC-to-DC stages to achieve extended possibilities for power conversion. Single or coupled inductors in subsequent stages, or preceding stages, can be coupled to the same core as L1 and L2 (and L3 for isolated version) or be on discrete cores. FIGS. 6a and 6b illustrate examples of this multi-stage approach. In FIG. 6a when switch B is turned on, or when switch D is turned on different return pathways for switch A are generated. When switch A closes current may pass through different windings on the same core, depending on the status of other switches, in this case switches B and D. Depending on L1, L2 and L3 values, and the duty cycles of switches A to E, different voltage or current transfer ratio can be generated. The presence of a new inductor on the same core, in this case L3, provides further possibilities for arbitrary transfer ratios without pushing frequency or duty cycles to extreme conditions. FIG. 6b shows a version with (n) inductors on the same core and an expanded number of switches to create even more daisy chained stages.

One application of this novel converter is to drive a Light Emitting Diode (LED). An AC input has a variable voltage ranging from 0 to a peak positive voltage and then returning to zero followed by a negative voltage reaching a negative peak and then again returning to zero. This usually happens 50 or 60 times per second for conventional AC power sources in commercial and industrial use. This widely variable voltage makes designing a high efficiency AC-to-DC converter a challenge. LED strings sometimes have significant voltage drops across them. To maintain a good Power Factor it is required to drain power from the AC line in each cycle, the same as a resistive load.

A typical approach for AC-to-DC conversion is to use a Diode Bridge to convert input AC to a rectified DC voltage, and then use this DC voltage at the input of a DC-to-DC converter to generate proper output voltage. When input voltage is approximately higher than the LED string voltage drop, a step down regulator is required. When the input voltage is approximately lower than the LED string voltage drop, a step up regulator is required. The disclosed converter supports step down and step up operations.

It is desirable to eliminate or reduce AC line flicker effect created by variations in AC voltage. One common example of a flickering light is a florescent light. Florescent lamps operating on AC can generate double the frequency of the AC line driving them. In LED light driven by AC, usually a Diode Bridge rectifier generates an output with dominant frequency component of twice the AC line frequency. For example for a 60 Hz AC line, a Diode Bridge rectifier generates an output with a dominant frequency of 120 Hz. If there is no energy storage in the system, as the line voltage changes, light intensity may vary and generate a 120 Hz flicker. Although humans cannot see light flickering at a frequency greater than 50 or so Hertz, the sensory system in some individuals can somehow detect the flicker. Ever since fluorescent lighting was introduced in workplaces, there have been complaints about headaches, eye strains and general eye discomforts.

The current invention has the ability to implement buck or boost operations. This shortens the duration of time power is not drained from the input. This reduces the amount of storage required to drive a LED during low momentary input voltages, referred to as a "transition period". Another approach used in the current invention is to drive an output load during a transition period using a series capacitor or super capacitor with the load. A simple boost or flyback stage can be connected to this capacitor and can use its energy to drive the LED when needed.

Figure 7A:
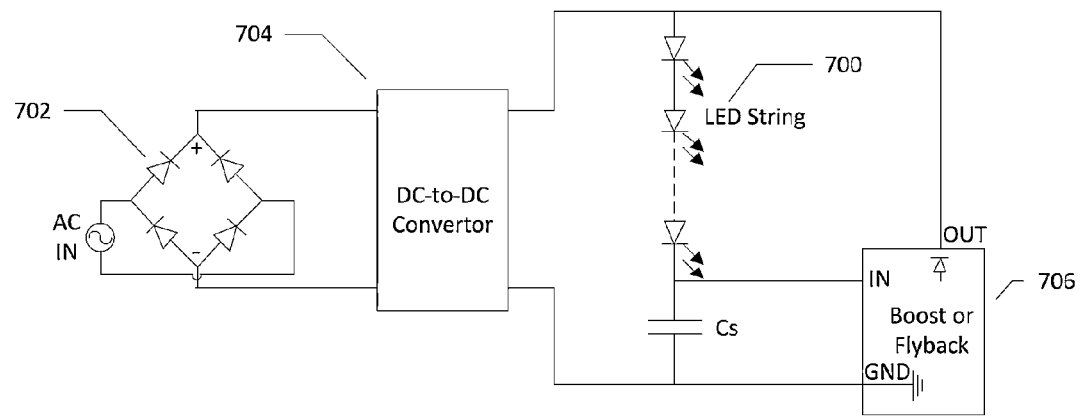
FIGS. 7a-7b illustrate flicker reduction circuits configured in accordance with embodiments of the invention.

FIG. 7a shows an LED string 700 with series storage capacitor, Cs. AC input is applied to a rectifier 702, which produces DC input, which is applied to DC-to-DC converter 704. The output of the DC-to-DC converter 704 is applied to the LED string 700. The capacitor Cs is in series with the LED string 700 and stores energy as current passes through the LED string 700. A controller 706 is connected to the input and output nodes of the capacitor Cs. The controller 706 implements a boost or flyback conversion.

The controller 706 can be designed to use the stored energy of capacitor Cs during a transition period to drive the LED string 700. When received electrical energy from the AC line is high, energy is stored and this energy is used to drive the LED string 700 when received energy from the AC line is low. As the power from the DC-to-DC converter 704 increases, output current charges the LED string 700 and the series capacitor Cs. The LED string 700 voltage drop combined with the capacitor Cs voltage drop reduces the current generated by the DC-to-DC converter 704. The momentary power is fairly constant and P=V*I; where "P" is momentary power, "V" is output voltage and "I" is output current. For a certain packet of energy released to the output, an increase in the output voltage drop reduces the effective current. The series capacitor Cs stored energy can be calculated as $0.5*Cs*V^2$. Using this energy to drive the LED string 700 reduces the series capacitor voltage drop, which subsequently increases the effective switching DC-to-DC output current. With proper design, the voltage rating for this series capacitor (or super capacitor) can be lower, equal to or higher than the LED string 700 voltage drop. This approach simplifies the design for storage system required for flicker reduction.

Figure 7B:
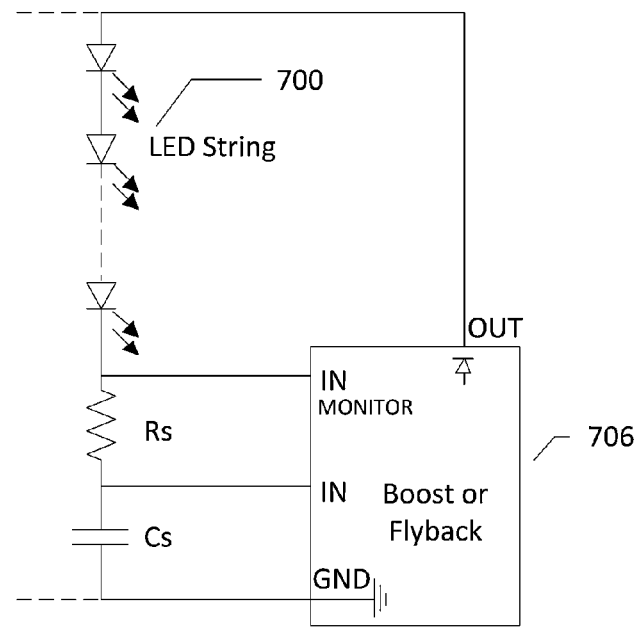

FIG. 7b shows the same stage with addition of a resistive component, Rs. Rs is a sense resistor that can be in series with the LED string 700 and Cs. Rs is a very low resistance to enable accurate monitoring of the LED string current and to enhance the accuracy of the flicker reduction stage.

Figure 8A:
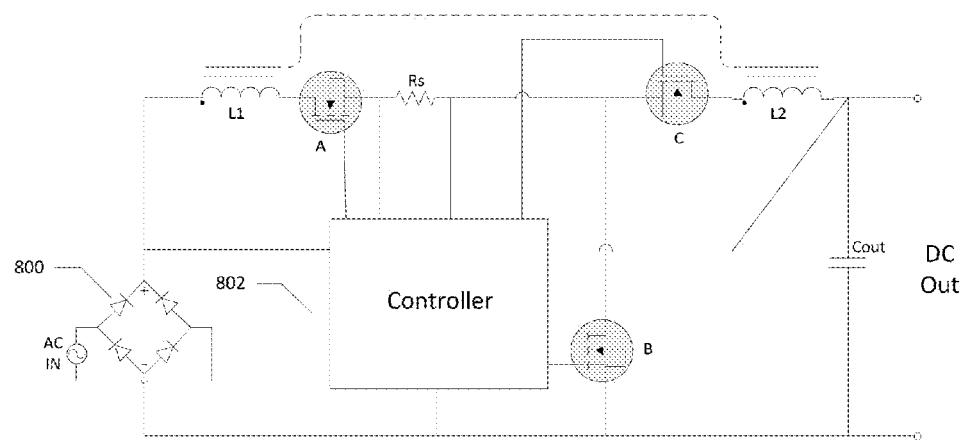
FIG. 8a illustrates an AC-to-DC converter incorporating a three switch embodiment of the invention.

FIG. 8a illustrates an example AC-to-DC converter incorporating a three switch embodiment of the invention. AC input is applied to rectifier 800. A controller 802 modulates the switching of switches A, B and C. When rectified DC voltage from rectifier 800 is higher than the DC output, controller 802 configures switches A, B and C as follows. Switch A is the master toggling switch and switch C is in the opposite state of switch A, while switch B is off. This emulates a buck mode. Switch A turns on until current through Rs reaches a saturation current of L1 and L2 in series, then switch A turns off and switch C turns on until current that passes through L2 reaches zero. This initiates the next cycle of switch A activity.

When rectified DC voltage from the bridge rectifier 800 is lower than (L1/(L1+L2)*DC out), the controller 802 configures switch A to be on, switch B is the master toggling switch and switch C is the inverse of switch B. This provides a boost equivalent conversion. Switch B turns on until current in Rs reaches L1 saturation current, then it turns off until current that passes L1 and L2 in series reaches zero.

When rectified DC voltage from bridge rectifier 800 is between (L1/(L1+L2)*DC out) and DC out, the controller 802 configures the switches as follows. Switch A is the master toggling switch, switch B is on and switch C is in the inverse state of switch A. As described before, this emulates a flyback conversion with one common input, output line. Switch A turns on until current in Rs reaches L1 saturation current, then it turns off until current that passes through L2 reaches zero. In FIG. 8a, capacitor Cout is optionally added to DC Out to reduce output ripple voltage. An output capacitor of this type may also be used with other embodiments of the invention.

Figure 8B:
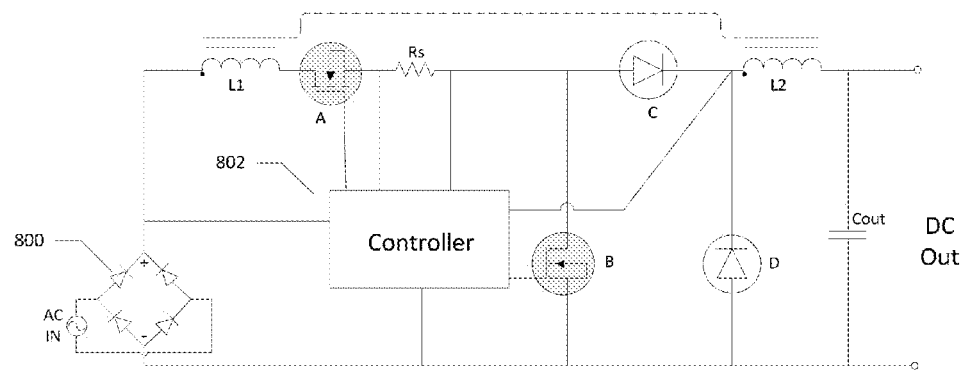
FIG. 8b illustrates an AC-to-DC converter incorporating a four switch embodiment of the invention.

FIG. 8b illustrates a similar circuit with four switches. The controller 802 only controls switches A and B. Switch C and switch D are diodes. This controller, like the other controllers of the invention, can implement three modes: buck, flyback and boost.

Those skilled in the art will appreciate that the relatively simple circuit of the invention supports buck, flyback and boost modes of operation with as few as two active switches. This facilitates lower component costs, smaller sizes and ease of manufacturing. Advantageously, the duty cycle transitions between modes of operation are relatively small, thereby reducing power losses. For example, an input voltage span of 36× (input voltage in the range of Vout/6 to Vout*6) can be supported by a range of duty cycles that never falls below 25%. In a flyback converter with a 1-to-1 ratio, over the same 36× input voltage span, the duty cycle drops to as low as 2.7%, resulting in large power losses. Thus, the invention provides a 9.25× enhancement in duty cycle efficiency compared to a prior art flyback converter.

The invention supports a switching frequency with a period of 100*(tFALL+tRISE), while still maintaining an efficiency higher than 95% over a 9× input voltage change (for example Vout/3 to Vout*3). For a typical switch with 10 nS fall and rise time, this can amount to a 500 KHz switching speed. Advantageously, the configuration of the circuit of the invention allows inductor cores as small as 0.25 cc to be used to convert in excess of 50 W.

Beside LED drivers, this invention can be used in any environment with a wide varying voltage, AC or DC. Examples of such applications are AC-to-DC or DC-to-DC converters for telecommunication equipment driving power from noisy lines, battery operated devices, such as notebook computers and handheld devices, or power supplies on automotive, train, boat, airplane and other vehicles.

Another application for this invention is any isolated AC-to-DC or DC-to-DC power supply. This includes but is not limited to, portable power supplies, portable computer power supplies and server computer power supplies.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A DC-to-DC converter, comprising:
   two or more inductors coupled to a common core;
   two or more active switches, wherein at least one active switch is in an input current path; and
   a controller to operate the two or more active switches such that a DC input is driven through one or more of the two or more inductors, such that the total number of effective inductors on the common core changes based on the status of the two or more active switches to implement a power conversion operation based upon a transfer ratio mode change;
   wherein the DC-to-DC converter has an input node and an output node and wherein the DC input is driven from the input node to the output node along a path without a capacitor.

2. The DC-to-DC converter of claim 1 wherein the power conversion operation is a boost operation.

3. The DC-to-DC converter of claim 1 wherein the power conversion operation is a buck operation.

4. The DC-to-DC converter of claim 1 wherein the power conversion operation is a flyback operation.

5. The DC-to-DC converter of claim 1 further comprising a passive switch.

6. The DC-to-DC converter of claim 1 wherein the at least one input switch monitors input load properties.

7. The DC-to-DC converter of claim 1 wherein at least one switch monitors output load properties.

8. The DC-to-DC converter of claim 1 wherein the at least one input switch is larger than the remaining switches.

9. The DC-to-DC converter of claim 1 further comprising a ceramic capacitor at the output node.

10. The DC-to-DC converter of claim 1 wherein the controller only employs duty cycles of 25% or more.

11. A DC-to-DC converter, comprising:
two or more inductors coupled to a common core;
two to four active switches, wherein at least one active switch is in an input current path; and
a controller to operate the two to four active switches such that a DC input is driven through one or more of the two or more inductors to alternately implement buck, boost and flyback power conversion operations based upon transfer ratio mode changes;
wherein the DC-to-DC converter has an input node and an output node and wherein the DC input is driven from the input node to the output node along a path without a capacitor.

12. The DC-to-DC converter of claim 11 further comprising a passive switch.

13. The DC-to-DC converter of claim 11 wherein the at least one input switch monitors input load properties.

14. The DC-to-DC converter of claim 11 wherein at least one switch monitors output load properties.

15. The DC-to-DC converter of claim 11 wherein the at least one input switch is larger than the remaining switches.

16. The DC-to-DC converter of claim 11 further comprising a ceramic capacitor at the output node.

17. The DC-to-DC converter of claim 11 wherein the controller only employs duty cycles of 25% or more.

18. A method of converting DC power, comprising:
receiving a DC input;
applying control signals to active switches, wherein the control signals have alternating duty cycles between 25% and 100%; and
driving the DC input, in response to the control signals, through at least one of two or more inductors on a common core to alternately implement buck, boost and flyback power conversion operations based upon transfer ratio mode changes;
wherein driving the DC input includes driving the DC input from an input node to an output node along a path without a capacitor.

19. The method of claim 18 further comprising employing an active switch to monitor input load properties.

20. The method of claim 18 further comprising employing an active switch to monitor output load properties.

* * * * *